United States Patent
Liu et al.

(10) Patent No.: US 6,442,195 B1
(45) Date of Patent: *Aug. 27, 2002

(54) MULTIPLE LOW SPEED SIGMA-DELTA ANALOG FRONT ENDS FOR FULL IMPLEMENTATION OF HIGH-SPEED DATA LINK PROTOCOL

(75) Inventors: Ming-Kang Liu, Cupertino; Man Ho Ku; Yukuang Wang, both of Milpitas, all of CA (US)

(73) Assignee: Integrated Telecom Express, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/925,003

(22) Filed: Aug. 27, 1997

Related U.S. Application Data

(63) Continuation-in-part of application No. 08/884,895, filed on Jun. 30, 1997, now Pat. No. 6,252,900, which is a continuation-in-part of application No. 08/884,979, filed on Jun. 30, 1997, now Pat. No. 6,092,122, which is a continuation-in-part of application No. 08/884,957, filed on Jun. 30, 1997, now Pat. No. 6,128,335, which is a continuation-in-part of application No. 08/884,958, filed on Jun. 30, 1997, now Pat. No. 6,065,060, which is a continuation-in-part of application No. 08/884,956, filed on Jun. 30, 1997, which is a continuation-in-part of application No. 08/884,959, filed on Jun. 30, 1997, now Pat. No. 6,073,179.

(51) Int. Cl.[7] .................................................. H04B 1/38

(52) U.S. Cl. ...................... 375/220; 375/222; 375/450; 375/377

(58) Field of Search .................................. 375/219, 222, 375/220, 259, 257, 316, 340; 455/73, 557, 500, 509, 422, 426, 555, 560, 561, 90; 370/278, 282, 329, 330, 336, 337, 345, 442

(56) References Cited

U.S. PATENT DOCUMENTS 4,620,294 A  10/1986  Leung et al. ................ 364/900

(List continued on next page.)

FOREIGN PATENT DOCUMENTS

WO    9528773    10/1995

OTHER PUBLICATIONS

Peter S. Chow, et al, "A Practical Discrete Transceiver Loading Algorithm for Data Transmission over Spectrally Shaped Channel," IEEE Transactions on Communications, vol. 43, No. 2/3/4, Feb./Mar./Apr., 1995, pp. 773–775.

(List continued on next page.)

Primary Examiner—Chi Pham
Assistant Examiner—Emmanuel Bayard
(74) Attorney, Agent, or Firm—J. Nicholas Gross

(57) ABSTRACT

An analog front end (AFE) circuit used in a high-speed communications system is presented that includes multiple stages each including a bandpass filter, base band modulator, low pass filter and Sigma-Delta modulator. Each stage processes a fractional portion of the total frequency of a wide bandwidth analog signal. The number of such AFE stages is configurable in parallel to process the entire bandwidth of the received signal. The AFEs can be incorporated in a single integrated circuit or similar suitable manner so as to be modular, and easily replaceable/upgradeable. To achieve minimum quantization noise and reduce manufacturing costs, the Sigma-Delta modulators in each AFE are made to have identical characteristics. Because the wideband signal is broken down into smaller frequency portions, the sampling rate, and thus the complexity and cost associated with the AFEs, is reduced significantly. In a preferred embodiment, a number of such AFEs are used in an ADSL modem for processing separate but roughly equal portions of the wideband ADSL signal containing data carrying DMT sub-channels. The separated portions are re-combined in a DMT receiver logic circuit to reconstruct the original data stream.

75 Claims, 7 Drawing Sheets

U.S. PATENT DOCUMENTS

| | | | | |
|---|---|---|---|---|
| 4,847,863 A | | 7/1989 | Watson | 375/8 |
| 5,161,154 A | | 11/1992 | Diaz | 370/95.1 |
| 5,170,470 A | | 12/1992 | Pindar | 395/275 |
| 5,285,474 A | | 2/1994 | Chow et al. | 375/13 |
| 5,479,447 A | | 12/1995 | Chow et al. | 375/260 |
| 5,519,731 A | | 5/1996 | Cioffi | 375/260 |
| 5,524,122 A | | 6/1996 | Lepitre et al. | 375/222 |
| 5,557,612 A | | 9/1996 | Bingham | 370/71 |
| 5,596,604 A | | 1/1997 | Cioffi | 345/260 |
| 5,627,863 A | | 5/1997 | Aslanis et al. | 375/357 |
| 5,715,280 A | * | 2/1998 | Sandberg et al. | 375/260 |
| 5,742,527 A | * | 4/1998 | Rybicki et al. | 708/109 |
| 5,809,422 A | * | 9/1998 | Raleigh et al. | 455/449 |
| 5,832,030 A | * | 11/1998 | Tzannes et al. | 375/260 |
| 5,838,799 A | * | 11/1998 | Cioffi et al. | 381/2 |
| 5,864,800 A | * | 1/1999 | Imai et al. | 704/229 |
| 5,898,744 A | * | 4/1999 | Kimbrow et al. | 375/376 |
| 5,960,036 A | * | 9/1999 | Johnson et al. | 375/219 |
| 6,002,722 A | * | 12/1999 | Wu | 375/295 |
| 6,011,785 A | * | 1/2000 | Carney et al. | 370/330 |
| 6,016,426 A | * | 1/2000 | Bodell | 455/422 |
| 6,028,891 A | * | 2/2000 | Ribner et al. | 375/222 |
| 6,035,000 A | * | 3/2000 | Bingham | 375/296 |
| 6,092,122 A | * | 7/2000 | Liu et al. | 709/277 |
| 6,128,335 A | * | 10/2000 | Liu et al. | 375/220 |
| 6,252,900 B1 | * | 6/2001 | Liu et al. | 375/219 |

OTHER PUBLICATIONS

Ian Galton and Henrik Jensen, "Delta–Sigma Modulator Based A/D Conversion without Oversampling," IEEE Transactions on Circuits and Systems—II: Analog and Digital Signal Processing, vol. 42, No. 12, Dec. 1995, pp. 773–784.

R. Khoini–Poorfard and D.A. Johns, "Time–Interleaved Oversampling Convertors," Electronics Letters, vol. 29, No. 19, Sep. 16, 1993, pp. 1673–1675.

Pervez M. Aziz, et al, "Multi Band Sigma Delta Analog to Digital Conversion," International Conference on Acoustics, Speech and Signal Processing, pp. 249–252, Apr. 19–22, 1994.

* cited by examiner

MULTIPLE LOW SPEED SIGMA-DELTA ANALOG FRONT ENDS FOR FULL IMPLEMENTATION OF HIGH-SPEED DATA LINK PROTOCOL

CROSS REFERENCE TO RELATED APPLICATIONS

The present application is a continuation-in-part and is related to the following additional applications all filed Jun. 30, 1997:

Ser. No: 08/884,895 now U.S. Pat. No. 6,252,900 entitled "Forwad Compatible and Expandable High-speed Communications System & Method of Operation."

Ser. No: 08/884,979 now U.S. Pat. No. 6,092,122 entiled "Rate Adaptable Modem with Forward Compatible and Expandable Functionality & Method of Operaton."

Ser. No: 08/884,957 now U.S. Pat. No. 6,128,335 entitled "Software Rate Adaptable Modem with Forward Compatible and Expandable Functionality & Method of Operation."

Ser. No: 08/884,958 now U.S. Pat. No. 6,065,060 entitled "Modular Multiplicative Data Rate Modem & Method of Operation."

Ser. No: 08/884,956 entitled "Device Driver for Rate Adaptable Modem with Forward Compatible and Expandable Functionality"

Ser. No: 08/884,959 now U.S. Pat. No. 6,073,179 entitled "User Controllable Applications Program for Rate Adaptable Modem with Forward Compatible and Expandable Functionality."

FIELD OF THE INVENTION

The present invention relates to analog front end (AFE) circuits for use in high-speed communications systems. In particular, the present invention is directed to AFEs having a number of parallel stages, each of which processes a fractional portion (frequency band) of a wideband signal by filtering, modulating, and converting such portion into a series of digital data samples. The present invention has particular applicability to ADSL modem environments.

BACKGROUND OF THE INVENTION

To provide high bit rate transmission over existing telephone subscriber loops, various modem technologies have been proposed. One of the promising solutions is the T1E1.4 Asymmetric Digital Subscriber Loop (ADSL) standard based on the Discrete Multiple Tone (DMT) technology. This standard provides up to 6.144 Mb/s transmission from the central office to a subscriber (downstream) and up to 640 kb/s transmission from the subscriber to the central office (upstream). To achieve this high bit rate transmission over existing telephone subscriber loops, advanced analog front end (AFE) devices, digital signal processing techniques, and high-speed complex digital designs are required. As a result, this pushes the current technology limit and imposes both high dollar cost and power consumption.

Among the technical challenges, AFE devices in modem applications provide the interface between the analog wave forms and the digital samples for digital hardware/software processing. In high-speed modem technologies such as ADSL, AFE devices need to operate at a very high sampling rate and high accuracy. For example, DMT technology has a signal spectrum of 1.1 MHz and requires sampling above 50 MHz if the sigma-delta analog-to-digital (ADC) method is used. This thus requires state-of-art ADC technology and imposes a high cost.

In addition to the speed requirement, the time domain signal in ADSL/DMT transmission is a summation of a large number of carriers modulated by a quadrature amplitude modulation (QAM) method. This results in a large peak-to-peak deviation. As a result, a large dynamic range and high resolution ADC is required to minimize quantization error.

There is prior art that uses multiple sigma-delta modulators to avoid high-speed quantization and its associated cost and consequences. One approach is proposed by P. Aziz, H. V. Sorensen, and J. Van del Spiegel who published a paper titled "Multi Band Sigma Delta analog to Digital Conversion" in the International Conference on Acoustics, Speech and Signal Processing, pp. III-249, Apr. 19–22, 1994. In this technique, sample-and-hold and quantization operations are performed in two blocks. Each sigma-delta modulator is different and operates on a different frequency band. Each sigma-delta modulator is followed by a corresponding Finite Impulse Response (FIR) filter to reject out-of-band noise. This approach is useful in some contexts, but suffers from various drawbacks, including: (1) requiring different FIR implementations, and (2) ineffective quantization noise reduction. But most importantly, it still requires high-speed sampling of the incoming signal.

A second approach is suggested by I. Galton and H. T. Jensen and disclosed in IEEE Transcations on Circuits and Systems, II, Analog and Digital Signal Processing, vol. 42, no. 12, p. 773, December 1995. Like Aziz et al., this disclosure shows that the sampling-and-hold and quantization are separated into two blocks. A Hadamard sequence is used to multiply the sampled signals before and after the sigma-delta quantization. From this scheme, the number of parallel sigma-delta modulators cannot be arbitrary due to the construction of Hadamard sequences, which makes it unattractive for systems that are designed to be upgraded easily and flexibly. Furthermore, it suffers the same limitation of high-speed sampling.

Another approach is proposed by R. Khoini-Poorfard and D. A. Johns and disclosed in IEE Electronics Letters, vol. 29, no. 19, p. 1673, September 1993. As with the other approaches, the sampling-and-hold and quantization is separated in two blocks. In this scheme, it divides the sampled sequence into different bit streams in the time domain and quantizes by different sigma-delta modulators to achieve the same effect of quantization noise reduction. Again, this technique requires high-speed sampling which is undesirable.

SUMMARY OF THE INVENTION

Accordingly, one object of the present invention is to provide a flexible and upgradeable solution to convert wideband signals to high resolution digital signals such as are found in typical high-speed ADSL communications systems;

A further objective of the present invention is to provide an analog front end receiving circuit having reduced quantization errors and reduced quantization noise, so that the performance of a communications system employing such circuit can be enhanced A further objective of the present invention is to reduce the sampling rate required in an analog front end receiving circuit, so that the conversion of a wideband analog signal to a high resolution digital signals can be accomplished with simpler and less costly Sigma-Delta modulators.

These objects and others are accomplished by providing a high speed communications transceiver which includes a novel front end receiving circuit for performing filtering and analog to digital conversion on a wideband analog data signal. The front end receiving circuit includes a number of stages that: (i) divide the wideband signal into a plurality of sub-bands, such that each sub-band includes data from a frequency band which is a fractional portion of the bandwidth of the wideband signal; and (ii) sample the sub-bands and generate digital signals corresponding to data carrying signals within such sub-band. A conventional signal processing circuit then extracts the received digital data from the digital signals from each of the plurality of sub-bands. The present invention is also compatible with software modem implementations in which the signal processing (or data pump) is located within a user host processing device instead of onboard the transceiver.

In a preferred ADSL embodiment, N sub-band filters in the front end circuit divide the analog data signal into N filtered analog data signals occupying N different frequency bands. To facilitate manufacture and flexible operation, the N frequency bands are chosen to be approximately equal to a frequency bandwidth size f, where f<F, and where F=N*f. The division of the input signal into multiple sub-bands has the added advantage of reducing clipping noise, and enables the use of lower speed sampling (instead of Nyquist sampling) analog to digital converters. Again in a preferred embodiment, the N sub-band filters are arranged in parallel stages which operate simultaneously on different frequency portion k*f of said analog signal, where k={0, 1, 2, 3, . . . N−1}. Further in a preferred embodiment, N is selected to be 2, 4, or 8, and f is approximately 138 khz, so that in a DMT environment, 32 subchannels are processed by each AFE stage.

A major contribution of the present invention lies in the reduction of quantization noise achievable in an ADSL transceiver which comes about as a result of baseband modulating the analog data signals after they are filtered to generate N frequency shifted (baseband) analog data signals. In such an implementation, N substantially identical Sigma Delta modulators and N filters can be used to effectuate an analog to digital conversion of the analog baseband signals.

The entire front end receiving circuit (or portions thereof, such as the sub-band stages) can be implemented in modular form such as in an integrated circuit. In this manner, front ends with varying performance can be conveniently fabricated and placed into communications systems with varying communications requirements. This also means that the receiving circuit of an ADSL modem employing the present invention can be upgraded in functionality easily and economically, and without affecting the remainder of a communications system.

In another variation of the invention, the front end receiving circuit can be made programmable, so that it can be dynamically configured by a control circuit to perform filtering and analog to digital conversion on input signals of varying bandwidth.

Another inventive aspect of the present disclosure includes a new distribution circuit, which is coupled to the transceiver and distributes the extracted data to one or more host processing systems. This circuit also controls the analog front end stages of the transceiver, so that the entire downstream data transmission can be broken up into virtual data ports that can be shared by a number of users. The allocation of data, therefore, contained in the DMT subchannels can be configured, controlled, and adjusted based on the bandwidth requirements and needs of such users in a "pooling" arrangement heretofore unavailable for ADSL environments.

One distinct advantage of using sigma-delta modulators as disclosed in the present invention, in contrast to regular Nyquist rate analog-to-digital (ADC) converters, is in the shaping of quantization noise, which is reduced in a low frequency band and increased in a high frequency band. By using a low pass FIR filter after sigma-delta modulation, the quantization noise can be greatly reduced using the present invention. Therefore, to take advantage of this uniqueness for ADSL/DMT applications, some pre-processing is used to shift different ADSL/DMT signal bands to baseband. Because fewer data samples are created by the AFE, a FFT stage in the DMT Rx core can also be reduced in size, complexity, and cost.

Although the inventions are described below in a preferred embodiment implementing the ADSL T1E1.413 standard, it will be apparent to those skilled in the art the present invention would be beneficially used in any high-speed rate-adaptable applications.

DETAILED DESCRIPTION OF THE INVENTION

General ADSL Background

Figure 1:
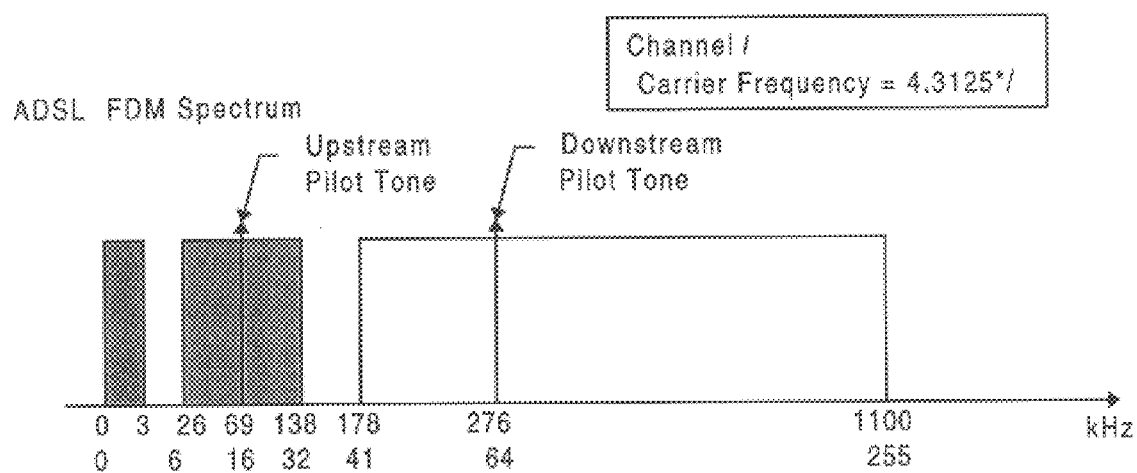
FIG. 1 is a pictorial depiction of the ADSL/DMT bandwidth allocation for upstream and downstream data in a channel based on frequency division multiplexing (FDM) configuration.

While some of the concepts set forth immediately below are well known, a brief explanation of ADSL technology is provided with reference to FIG. 1 to facilitate an understanding of the present invention. As explained above, it is well known in the art to use DMT to effectuate the ADSL standard. In contrast to most modulation schemes, such as AM/FM transmissions that use one carrier, DMT uses multiple carriers to transmit data bits. Specifically, T1E1.4 ADSL standards specify an up to 255 channels for downstream transmission from the central office to subscribers and up to 31 channels for upstream transmission from subscribers to the central office. As shown in FIG. 1, each carrier has a bandwidth of 4.3125 kHz. The total bandwidth is 1.1 MHz for a total of 255 channels. In the upstream direction, a "pilot" tone in the approximate range of 69 kHz, is used for maintaining timing synchronization. A similar pilot tone is transmitted in the downstream direction in the vicinity of 276 kHz.

Since upstream and downstream transmissions are over the same 2-pair twisted wire, they need to be separated by either echo cancellation (EC) or frequency division multiplexing (FDM). Echo cancellation allows simultaneous transmissions in both directions but requires a complex echo canceler implementation. On the other hand, FDM uses two different frequency bands for separate downstream and upstream transmissions. As shown in FIG. 1, the upstream transmission uses sub-channels from channel number 6 to 31, and the downstream transmission uses sub-channels from channel number 41 to 255. While the remainder of the discussion below focuses on a system employing FDM, it will be appreciated by those skilled in the art that the present invention is adaptable and can be used beneficially with echo-cancellation approaches as well.

As with most communication environments, the transmission bit rates for both upstream and downstream communications in ADSL are not fixed but instead are determined by the quality of the channel. In the present invention, a number of well-known techniques can be used advantageously for setting up the initial data link. In general, these techniques work as follows: during initialization, the channel quality is measured and a certain data rate (typically a number of bits) is assigned for each DMT sub-channel; thereafter, a "handshaking" process is used to dynamically and adaptively change the bit loadings (and energy levels). The latter is often necessary because (among other things) the overall channel characteristics may vary over time, the target bit rate may change, or new bit distributions among the sub-channels may be required.

The quality of the sub-channel response can be measured by the received signal to noise (SNR) ratio. According to the Shannon theorem, the upper limit of the number of bits per unit Hz that can be transmitted is $\log_2(1+SNR)$. Therefore, by measuring the received SNR or equivalent parameters at the receiver end, one can determine the number of bits allocated for each sub-channel modulation. The total data throughput rate achieved by the system, therefore, is simply the sum of all the data rates of all the usable sub-channels.

According to the T1E1.4 ADSL standards, data bits are grouped and processed every 250 $\mu$sec. The number of bits that can be processed over one such time frame is the summation of the bits allocated for each sub-channel determined from the previous channel response measurement. For a given number of bits assigned to a certain sub-channel, quadrature amplitude modulation (QAM) is used to convert bits to a complex value, which is then modulated by the sub-channel carrier at the corresponding frequency.

The above is merely a brief summary of the general operation of a typical DMT/ADSL communications system. The general circuits used in prior art ADSL systems, the specifics of the bit/energy loading process for the sub-channels, the bit fine tuning process, and the details of the modulation of the sub-channels, are well-known in the art, and will not be discussed at length herein except where such structures or procedures have been modified in accordance with the teachings herein.

Analog Front End Circuit of Present Invention

The full downstream data throughput of a typical prior art ADSL standard transceiver approaches 6 Mbps, which is more than 200 times the speed of conventional analog modem technology. This requirement was imposed since a large part of the initial motivation to implement ADSL was to achieve high-speed multimedia communications and video teleconferencing. Nevertheless, as explained above, the analog front end hardware required to process a full bandwidth ADSL signal is relatively complex and costly.

In general, the present invention works roughly as follows: the ADSL signal is broken up and separated into frequency bands so that each band can be operated on independently by an analog front end circuit. In this way, a number of simpler, less costly analog front end circuits, each processing a fraction of the ADSL signal, can combine to process the entire ADSL bandwidth signal.

Figure 1B:
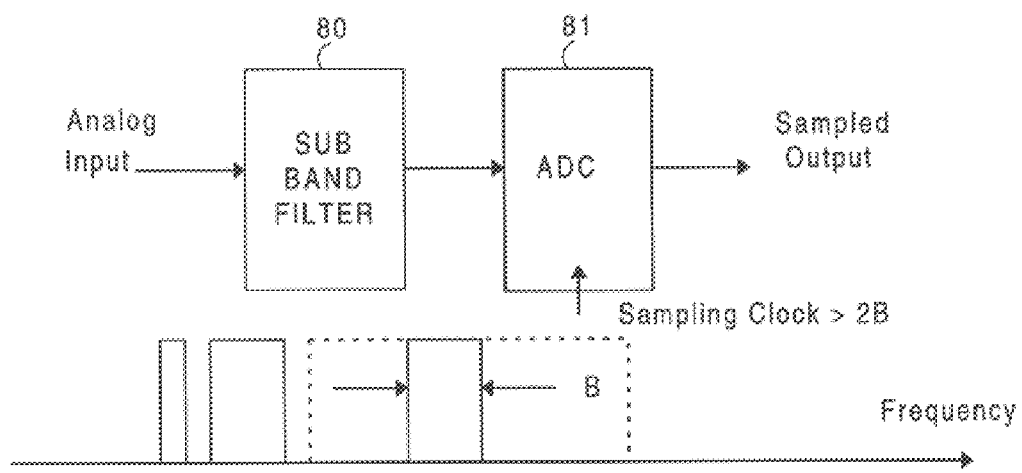
FIG. 1B shows the relationship between a sub-band filter and an analog to digital converter that can be used in an analog front end (AFE) of the present invention.
Figure 1C:
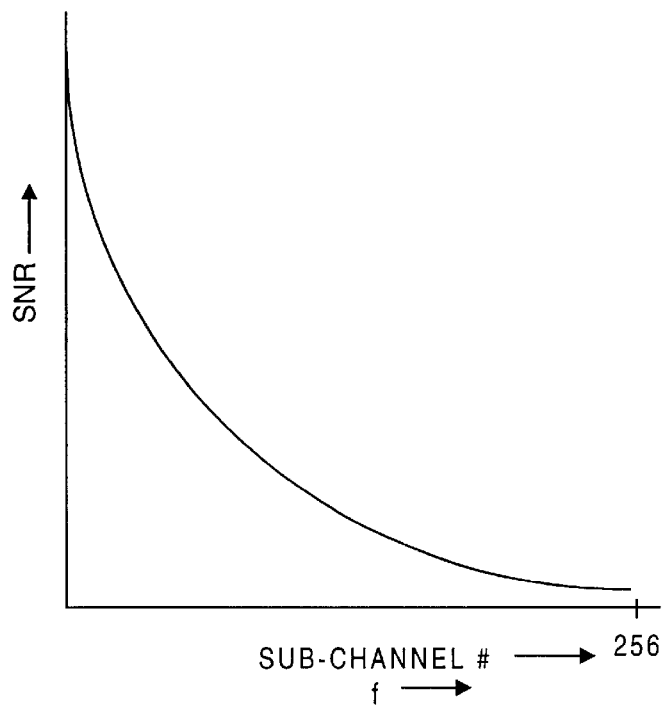
FIG. 1C is a pictorial depiction of a SNR curve for a typical subscriber loop channel using sub-channel modulation.

The principle behind the present invention is as follows: as shown in FIG. 1B, if an incoming signal is restricted to a smaller bandwidth by a sub-band filter 80, according to the Nyquist sampling theorem, the sampling rate of AFE devices (such as ADC 81) that perform analog to digital conversion can be significantly reduced. Specifically, therefore, if the total downstream bandwidth is divided into bands of size B Hz (in a preferred embodiment using DMT in an ADSL environment, B=32 DMT channels wide or about 138 kHz for each band) as shown below, we can limit the Nyquist sampling rate for any particular band to around 276 kHz for such analog front end. In other words, by dividing the input analog signal into multiple bands, a system can be constructed that achieves full bandwidth utilization by significantly lower sampling rates. Such a system is achievable with ADCs significantly more relaxed in performance requirements.

Figure 1D:
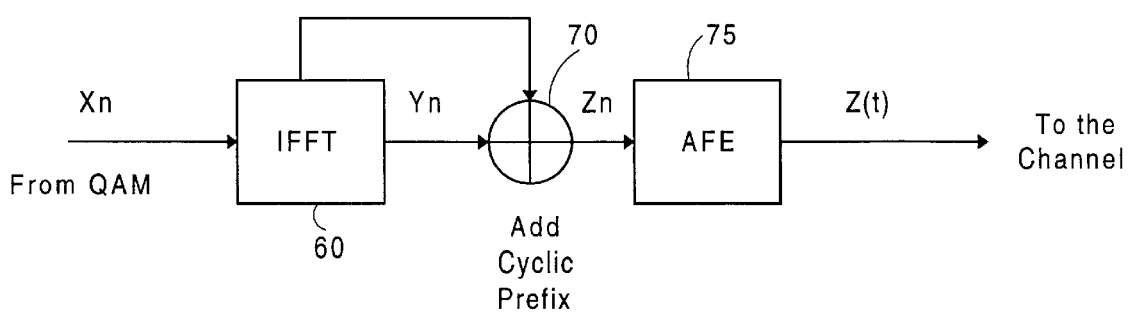
FIGS. 1D–1G are mathematical modellings and charts that further explain the underlying physical premises of the present invention based on DMT.
Figure 1E:
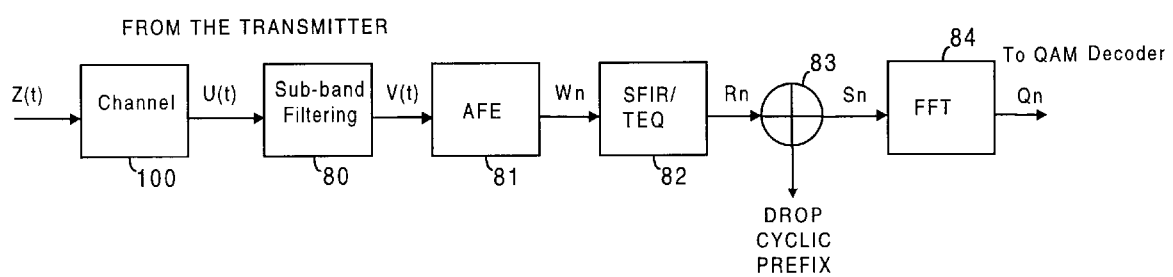

A subset of a DMT transmitter is shown in FIG. 1D; correspondingly, a portion of a receiver section employing the present invention is depicted in FIG. 1E. The physical operation and underlying theory of such sections are discussed in detail in the aforementioned applications (Ser. Nos.: 08/884,895, 08/884,979, 08/884,957, 08/884,958, 08/884,956, 08/884,959) and below as well to help illuminate the basis of the present invention. Since the focus of the present invention is on the analog front end receiving circuit 295, however, a detailed description of such circuit is first given with reference to FIGS. 2 and 3.

Figure 2:
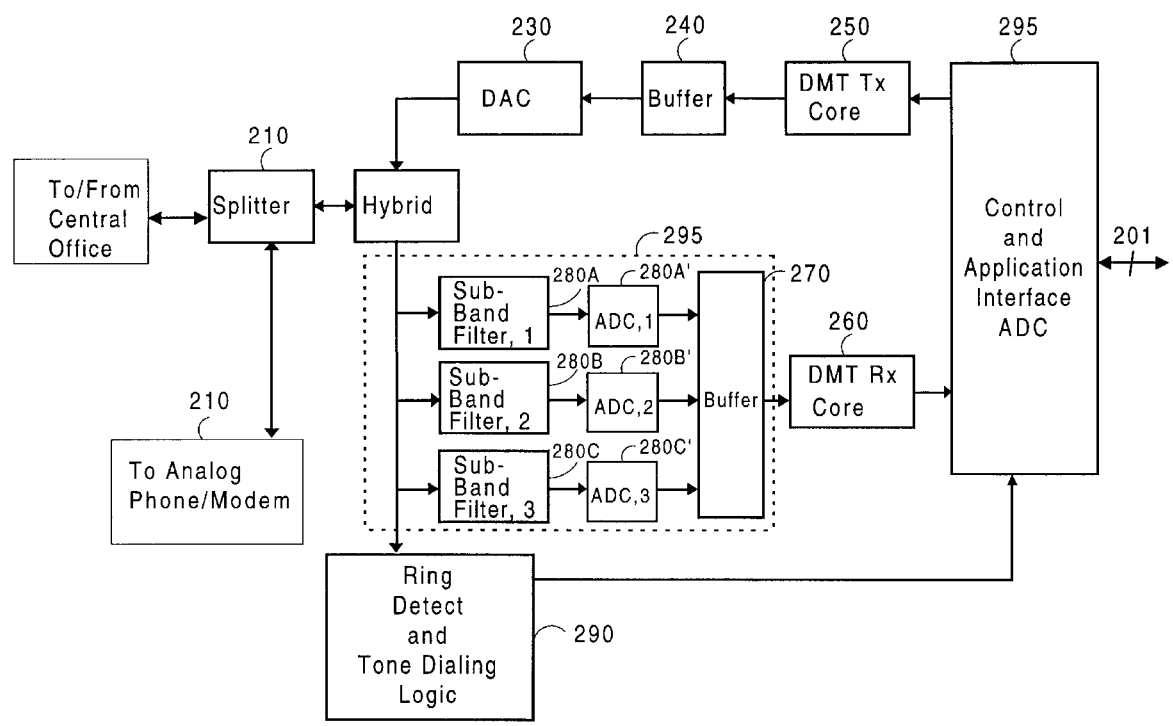
FIG. 2 is a block diagram of a general implementation of a communications system employing the improved analog front end of the present invention, adapted for use in an ADSL environment.

Because the structure and operation of ADSL transceivers is well known in the art, the present description primarily details only those aspects of such transceivers which are necessary to an understanding of the inventions herein. As seen in FIG. 2, a channel 100 is made of a regular copper wire "loop", which may have different electrical properties, transmission lengths (sizes), varying attenuation characteristics, and various impairments or interferences. Splitter 210, a conventional and well-known circuit, separates a DMT signal occupying more than 200 sub-channels from a lower end 4 kHz POTS analog signal. The latter can be used for simultaneous voice or data communicatins using conventional analog modem. Hybrid circuit 220 is also well known in the art, and consists primarily of conventional transformers and isolation circuitry to separate, receive and transmit signals. A ring detect logic circuit 290 can also be implemented using accepted techniques, to alert a Control Interface 245 to the existence of a transmission signal originating from an upstream transceiver (not shown).

A receiver analog front end (AFE) 295 consists of a number of smaller AFE stages for performing filtering and sampling operations to convert the received full bandwidth ADSL signal to a series of digital samples for further processing by DMT Rx Core 250. In accordance with a preferred embodiment of the present invention, a combination of pairs of sub-band filters 280, 280A, 280B and corresponding low cost, low sampling speed Sigma Delta Modulators generally designated 280', 280A', 280B', etc., are used for the parallel AFE stages. While not shown explicitly in this figure, is also well known that a low pass filter is used at the output of each Sigma Delta Modulator. Bach sub-band filter/Sigma-Delta Modulator pair in this case handles and converts a frequency band representing a fractional portion of the ADSL signal. In this respect, each such pair can be considered as a single band signal processing circuit, with its own analog-to-digital data path, and AFE 295 can be considered as a multi-band signal processing circuit. The converted digital signal samples from each of the data paths is stored in buffer 297 before being sent to and later recombined (to reconstruct the original data signals) in DMT Rx Core.

DMT Receiver Core 260 (sometimes referred to as the data pump) is generally responsible for monitoring and measuring the SNR of the sub-channels and for extracting and recombining the original data signals from the numerous sub-carriers. As is known in the art, the signal processing logic for performing this function can reside either on a dedicated digital signal processor and support circuitry directly coupled to buffer 297, or alternatively, the signal processing capabilities of a user host processing device accessible on bus 201 may be employed for this purpose in a manner conventionally known as a "software" modem implementation. From the present discussion it will be apparent to skilled artisans that the present invention is not limited in any respect by the particular implementation of DMT Receiver Core 260 or DMT Transmit Core 250.

Control Interface 245 communicates and coordinates data flow between a host (not shown) or similar system and DMT Rx Core 260 (and/or DMT Tx Core 250) using data path 201. On the transmit side, DAC 230 and Buffer 240 in the front end transmitting circuit preferably transmit any upstream data transmissions using a second frequency bandwidth different from that of the downstream data transmission. However, this is not necessary in systems using echo-cancellation. Furthermore, in ADSL applications, the size of this bandwidth is considerably smaller, and uses only L sub-channels, where L<M. In other xDSL applications, L may be on the same order or larger than M.

Control Interface 245 can also include suitable processing and control logic for configuring the high speed system of FIG. 2 so that the data is routed through the various AFE data path stages to a number of users, in a manner commonly referred to as a "modem pool" arrangement. In such a configuration, a number of independent users can receive and transmit data using data path 201, and the total available ADSL bandwidth can be shared in manner only previously available for shared T1 and E1 type systems. In a preferred ADSL embodiment, each user of the high speed system shown in FIG. 2 can receive data through a data port which includes data from one or more different subsets of the available DMT subchannels which are passed by the various AFE stages. For example, a port may consist of a single group of 32 subchannels, or a combination of groups, and a user can, through appropriate configuration information provided to Interface 245, flexibly control the port configuration. In some implementations, Interface 245 may perform the above functions as a stand alone data distribution circuit entirely separate from the rest of the transceiver and connected through suitable bus interfaces to DMT Tx 250 Core 250, DMT Rx Core 260 as well as to the various users of the high speed system.

Figure 3:
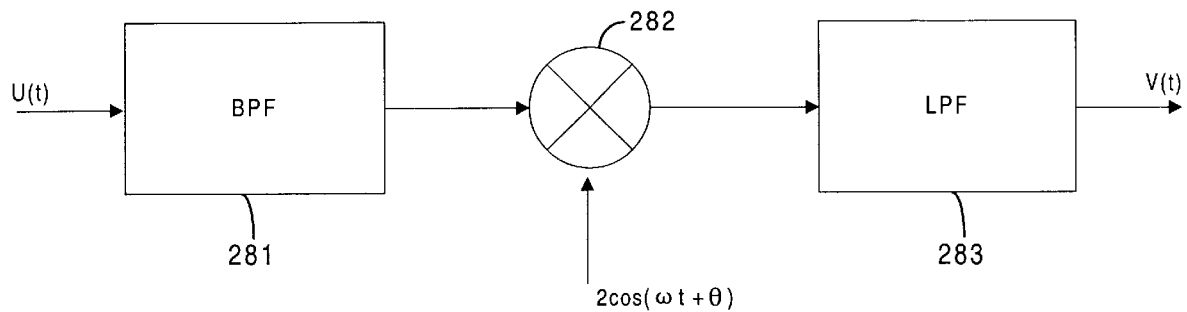
FIG. 3 is a block diagram of a sub-band filter used in the present invention

A preferred embodiment of a Sub-Band Filter 280A is shown in FIG. 3. In this embodiment, a wideband ADSL data signal U(t) received through channel 100 is first bandpassed through Bandpass Filter (BPF) stage 281. BPF 281 filters and passes only a selected portion of the input signal (band) in the frequency domain. Correspondingly, additional BPF filters associated with Sub-Band Filters 280B, 280C, etc. filter and pass only other selected portions (bands) of the input signal. Filtered output $h_{BPF}(t)$ is shifted to a base band frequency by a carrier modulation $2\cos(\omega t+\theta)$ at stage 282. Low pass filter (LPF) 283 then is used to reject any high frequency portions introduced by carrier modulation stage 282. The intermediate output V(t) of LPF stage 283 is thus given as:

$$V(t)=2[(u(t)\hat{\times}h_{BPF}(t))\cos(\omega t)]\hat{\times}h_{LPF}(t))$$

This output is then received by an ADC 280A', where it is sampled and converted into a corresponding fractional portion of the original transmitted digital data samples. In the case mentioned above, for example, the digital data samples would correspond to those sample associated with data signals in the sub-carriers falling in the DMT sub-channels within the pass band B. The digital data samples from each of the ADCs 280A', 280B', 280C' etc., are stored in buffer 297 before being sent to DMT Rx Core 260. It is apparent, based on the breakup of the original ADSL signal, and the baseband shifting step noted above, that the only modification required of a traditional ADSL transceiver implementation is that the sub-channels must be re-shifted back to their original position in DMT Rx Core 260, and then recombined, and this can be accomplished using a number of well-known techniques. In this manner, the original ADSL signal can be divided into manageable sized frequency blocks (bands) across a number of parallel signal processing stages (AFEs). The invention is by no means limited to ADSL implementations, however, and it will be evident to skilled artisans that the teachings herein are widely applicable to a number of narrow channel bandwidth, large frequency signal based communications systems.

To simplify manufacturing, construction, and operation, it is preferable that each of the Sub-Band filters 280A, 280B, 280C, etc. be structurally the same and have substantially identical characteristics (except for the center frequency, of course, which determines which portion of the incoming signal is filtered). Dividing the received signal into multiple sub-bands has the added advantage of reducing the clipping noise. Most importantly, using a baseband input signal to each sigma-delta modulator stage achieves the minimum quantization noise from sigma-delta noise shaping, which is well known in the art. This phenomenon is shown with reference to FIG. 1H, where it can be seen that by pushing the filtered signal to baseband, the output of the sigma delta modulator (and low pass filter) stages has only a minimal noise portion concentrated below sampling frequency fs/2 because most of the noise associated with higher frequencies is filtered. This is in contrast to a Nyquist analog to digital converter, which, as well known in the art, has approximately a flat noise spectrum across the entire frequency band. Therefore, reducing the sampling rate of such converters and performing low pass filtering does not result in an as much quantization noise improvement as the sigma delta modulator embodiments of the present invention.

Moreover, each of the individual signal processing circuits within Receiver Front End 295 processes and handles the same size frequency band (or a signal encompassing the same number of sub-channels or perhaps data samples within the DMT signal). The Sigma-Delta modulators used in ADC 280A', 280B', 280C' can also be fabricated simply, since they can have identical structural and operational characteristics. This is because the input to each is a baseband modulated signal which has essentially the same characteristics for each of the bands within the multi-band AFE 295. Nevertheless, the invention is not limited to such specific embodiments, and it is conceivable that other arrangements may be necessary or more optimal depending on the particular environment in which the present invention is used.

Preferably, too, the Sub-Band Filters and associated ADCs may be implemented as a single integrated circuit as part of a larger IC chip. In another variation, sub-band filters and ADCs may be incorporated into a high-speed modem in a modular, expandable bank form, as for example might be found on a printed circuit board (or similar mounting). Each AFE 295 can be implemented in a fixed hardware configuration, or individually programmed/controlled to pass a certain portion of the downstream data transmission. Under either of the above scenarios, a high-speed modem of varying capabilities may be effectuated by simply varying the nature of the AFE 295. Because the present invention has such modular and controlled performance characteristics, users of modems incorporating such front end circuits are afforded an easy path to forward and upward expansion of the overall functionality of their system.

It should be understood that the above discussion applies equally to the other sub-band filter stages described above (namely, sub-band filters 281, 282, etc.) It is conceivable, however, that in some implementations, or during some communications operations, because the signal requirements may not be as demanding, it may not be necessary to utilize each of the separate front end data processing paths or AFEs (i.e., each combination of sub-band filter and ADC) at all times.

Moreover, in some instances where it is appropriate, an adaptive or tunable filter may be used for BPF 280A, such that the target frequencies of the passband and size of the passband are adjustable. This approach, too, would permit another variation of the present invention, in which two or more combinations of sub-band filters and ADCs are used as shown in FIG. 3, but the entire input signal is not processed at the same time. Instead, for example, half of such signal could be processed in a first time period, and output to buffer 270. While this first data output was being read by DMT Rx Core 260, the processing of the second half of the signal could take place, so that it could be ready when DMT Rx Core 260 is ready to read the same. The output of each such signal processing circuit (sub-band filter and Sigma-Delta modulator pair) could be alternately gated to buffer 270, in the same manner as done in other conventional high-speed memories to effectuate high-speed data rates. Other similar variations will be apparent to skilled artisans from the above teachings.

The present invention can also be used in connection high-speed data communications systems, such as described in applications referenced above that can make use of a portion of the total ADSL bandwidth, while still being upwardly compatible and forward expandable with such standard. In such systems, a data link is established so that the downstream transmission is limited to a certain number of sub-channels within the AFE and signal processing capabilities of the receiver. The number of sub-channels supported by the receiver in such system can be augmented at any time by using a single higher end modular replacement AFE 295, or alternatively, a number of lower end modular AFEs 295 in the manner described herein.

It will also be appreciated by those skilled in the art that the present invention can be embodied in an ADSL modem comprised of different combinations of hardware and software. These specific embodiments are described in more detail such as described in the applications noted above, which are incorporated by reference herein. Some special features of the present invention include the fact that:

(i) unlike hardware architectures implementing a full T1E1.413 ADSL standard, the present invention uses a series of sub-band filters in the front end. As mentioned earlier, the use of these filters allows low speed sampling instead of high speed Nyquist sampling by the ADC.

(ii) standard ring detection logic is incorporated to support existing modem features;

(iii) DMT Rx core 260 is basically implemented the same way as specified by T1E1.4, but with some important differences, specifically:

[a] due to sub-band filtering and lower speed sampling, the frequency channels at the output of FFT (not shown) in the DMT Rx Core have a different frequency shift depending on the frequency band processed;

[b] Since each AFE group consists of fewer points, actual FFT implementation is smaller, simpler and more cost-effective in the DMT Rx Core 260;

(iv) Control logic 295 permits the system to behave essentially like a conventional analog modem, and is used to support necessary setup tasks such as dialing and handshaking;

(vi) because a smaller portion of the spectrum is processed by each AFE stage, the peak-to-peak deviation of the downstream signal is reduced, and this helps to minimize quantization errors;

(vii) since the sub-band filtered output is baseband modulated to a lower frequency, quantization noise is also reduced; and (viii) since the division of the received signal into multiple sub-bands, the clipping noise is reduced;

Underlying Theory of Present Invention for ADSL/DMT Applications

Discussion of the underlying theory that supports the premise of the present invention now follows. In particular, this section shows the mathematical foundation for the use of multiple low speed AFE's to sample a full bandwidth ADSL/DMT signal. It will be apparent to those skilled in the art, after reading this discussion, that the present inventions can be advantageously used in a number of rate adaptable communications environments, including CAP implementations of ADSL.

DMT Transmitter

To simplify the present discussion, only a subset of the DMT transmitter is considered, as shown in FIGS. 1D and 1E. The combined model that includes the channel response and the DMT receiver is shown below, where only one branch of sub-band filtering and sampling is shown for simplicity. To further simplify the discussion, the channel response and the SFIR are combined together.

The result shows that the DMT signals within the selected band can be recovered with the same use of impulse response shortening technique. By combining multiple AFE stages that cover different frequency bands, all DMT sub-channels can be recovered.

IFFT

In an ADSL environment as shown in FIG. 1D, N (N=512) frequency domain variables are transformed into the time domain by IFFT block 60

$$y_n = \sum_{i=0}^{N-1} x_n e^{j2\pi i n/N}$$

Cyclic Prefix c time domain variables at the end are added to the prefix of the sequence as shown in FIG. 1D by block 70

$$\{Z_n\} = \{Z_{-c}, Z_{-c+1}, \Lambda, Z_{-1}, Z_0, Z_1, \Lambda, Z_{N-1}\} = \{y_{N-1}, y_0, \Lambda, y_{N-1}\}$$

AFE/DAC

Discrete time domain sequence are converted by AFE 75 to the continuous time domain waveform as follows:

$$z(t) = \sum_{n=-\infty}^{\infty} z_n p_{TX}(t - nT_c),$$

where $p_{TX}(t)$ is the transmitter pulse of the AFE/DAC used, and $T_c$ is the transmitter DAC clock period and equal to $$T_c = \frac{250 \text{ μsec}}{N + c}$$

according to the DMT ADSL specifications.

Channel

With reference now to FIG. 1E, if the channel 100 impulse response is $h_c(t)$, we have $$u(t) = \sum_{n=-\infty}^{\infty} z_n p_{RX}(t - nT_c)$$

where $p_{RX}(t) = p_{TX}(t) \hat{\times} h_c(t)$.

Sub-band Filtering

The signal $u(t)$ representing the full received ADSL signal is then passed through Sub-Band Filter stage 380, described above in connection with FIG. 3. An output, $v(t)$ from, such stage is given as:

$$v(t) = \left\{ \left[ \sum_{n=-\infty}^{\infty} z_n p_{RX}(t - nT_c) \otimes h_{BPF}(t) \right] (e^{j\omega t} + e^{-j\omega t}) \right\} \otimes h_{LPF}(t)$$

$$= \left\{ \left[ \sum_{n=-\infty}^{\infty} z_n e^{j\omega n T_c} p_{RX,BPF}(t - nT_c) e^{j\omega(t-nT_c)} \right] + \right.$$

$$\left. \left[ \sum_{n=-\infty}^{\infty} z_n e^{-j\omega n T_c} p_{RX,BPF}(t - nT_c) e^{-j\omega(t-nT_c)} \right] \right\} \otimes h_{LPF}(t)$$

$$= \sum_{n=-\infty}^{\infty} z_n^+ p_{sub,-}(t - nT_c) + \sum_{n=-\infty}^{\infty} z_n^- p_{sub,+}(t - nT_c)$$

where $$p_{RX,BPF}(t) = p_{RX}(t) \hat{\times} h_{BPF}(t),$$

$$z_n^+ = z_n e^{j\omega n T_c},$$

and $$p_{sub-}(t) = |p_{RX,BPF}(t) e^{j\omega t}| \hat{\times} h_{LPF}(t)$$

$$p_{sub+}(t) = |p_{RX,BPF}(t) e^{-j\omega t}| \hat{\times} h_{LPF}(t)$$

AFE/ADC

Let the sampling clock be $T_S = T_C \times L$. This means a slower sampling by a factor of L for the AFE stage 81 following the sub-band filtering stage. Thus, $$w_k = \sum_{n=-\infty}^{\infty} z_n^+ p_{sub,-}(kLT_c - nT_c) + \sum_{n=-\infty}^{\infty} z_n^- p_{sub,+}(kLT_c - nT_c)$$

$$= \sum_{n=-\infty}^{\infty} z_n^+ p_{sub,-}([kL - n]T_c) + \sum_{n=-\infty}^{\infty} z_n^- p_{sub,+}([kL - n]T_c)$$

For causal pulses $p_{sub,\pm}(t)$, we have $$w_k = \sum_{n=-\infty}^{kL} z_n^+ p_{sub,-}([kL - n]T_c) + \sum_{n=-\infty}^{kL} z_n^- p_{sub,+}([kL - n]T_c)$$

$$= \sum_{n=0}^{\infty} z_{kL-n}^+ p_{sub,-}(nT_c) + \sum_{n=0}^{\infty} z_{kL-n}^- p_{sub,+}(nT_c)$$

Shortening FIR (SFIR)

After AFE discrete time sampling, a time domain equalizer (TEQ) called SFIR 82 is used to reduce the combined discrete time impulse response to a duration smaller than c. If the SFIR response is $h_{SFIR}[n]$, we have $$r_k = \sum_{i=0}^{\infty} w_{k-i} h_{SFIR}[i]$$

$$= \sum_{i=0}^{\infty} \left[ \sum_{n=-\infty}^{(k-i)L} z_n^+ p_{sub,-}([(k - i)L - n]T_c) + \right.$$

$$\left. \sum_{n=-\infty}^{(k-i)L} z_n^- p_{sub,+}([(k - i)L - n]T_c) \right] h_{SFIR}[i]$$

$$= \sum_{n=-\infty}^{kL} z_n^+ h_{tot}^-[kL - n] + \sum_{n=-\infty}^{kL} z_n^- h_{tot}^+[kL - n]$$

$$= \sum_{n=0}^{\infty} z_{kL-n}^+ h_{tot}^-[n] + \sum_{n=0}^{\infty} z_{kL-n}^- h_{tot}^+[n]$$

where $$h_{tot}^\pm[kL - n] = \sum_{i=0}^{\infty} h_{SFIR}[i] p_{sub,\pm}([kL - n - iL]T_c)$$

Physical Meaning of $h_{tot}^\pm[n]$

If discrete Fourier transforms for $$h_{tot}^\pm[n]$$

are performed at FFT stage 84, we obtain $$H_{tot}^\pm[\omega] = \sum_{n=0}^{\infty} h_{tot}^\pm[n] e^{-j\omega n T_c}$$

$$= \sum_{n=0}^{\infty} \sum_{i=0}^{\infty} h_{SFIR}[i] p_{sub,\pm}([kL - n - iL]T_c) e^{-j\omega(kL-n)T_c}$$

$$= \sum_{i=0}^{\infty} h_{SFIR}[i] e^{-jL\omega i T_c} \sum_{n=0}^{\infty} p_{sub,\pm}([kL - n - iL]T_c) e^{-j\omega(kL-n-iL)T_c}$$

$$= H_{SFIR}[L\omega] H_{sub,\pm}[\omega]$$

where $H_{SFIR}[L\omega]$ and $H_{BPF}[\omega]$ are the DFT's with period $1/(LT_C)$ and $1/T_C$, respectively.

Figure 1F:
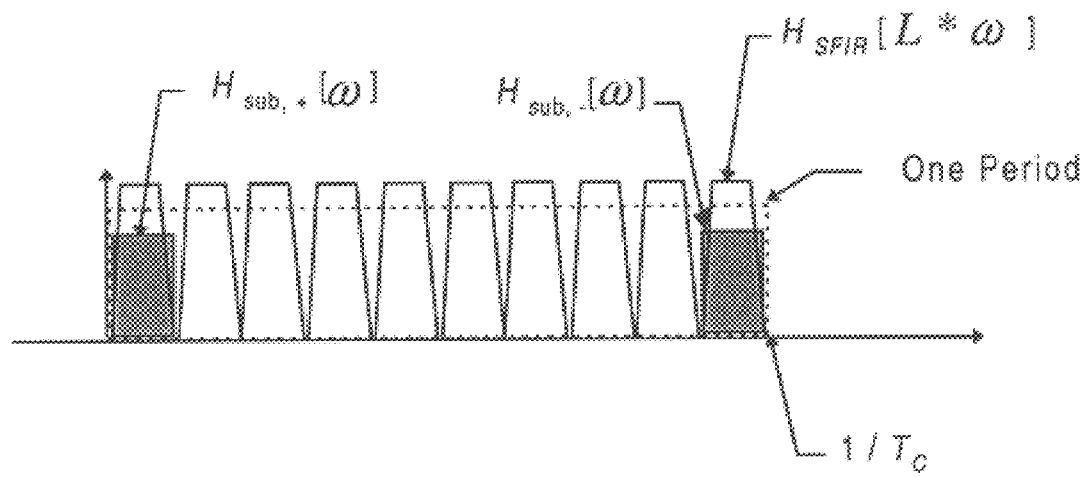

Their spectra can be illustrated as shown in FIG. 1F for L=10.

Dropping Cyclic Prefix

With reference to FIG. 1E again, by dropping the cyclic prefix of length c/L, at block 83 we consider only $s_k = r_k$, $k = 0, \Lambda, N_1 - 1$, where $$N_1 = N/L$$

Therefore, it can be seen at this point that the number of data samples from the ADC is also reduced, thus reducing the complexity and cost for FFT stage 84.

FFT

Performing FFT at block 84 for $s_k$, k=0,Λ, (N/L)−1, one obtains $$q_n = \sum_{l=0}^{N_1-1} s_l e^{-j2\pi nl/N_1}$$

$$= \sum_{k=0}^{N_1-1} r_k e^{-j2\pi nk/N_1}$$

$$= \sum_{k=0}^{N_1-1} \left( \sum_{i=0}^{\infty} z^+_{kL-i} h^-_{tot}[i] + \sum_{i=0}^{\infty} z^-_{kL-i} h^+_{tot}[i] \right) e^{-j2\pi nk/N_1}$$

$$= \sum_{k=0}^{N_1-1} \sum_{i=0}^{\infty} (z^+_{kL-i} h^-_{tot}[i] + z^-_{kL-i} h^+_{tot}[i]) e^{-j2\pi n(kL-i)/N} e^{-j2\pi ni/N}$$

$$= \sum_{i=0}^{\infty} \sum_{k=0}^{N_1-1} (z^+_{kL-i} e^{-j2\pi n(kL-i)/N} h^-_{tot}[i] e^{-j2\pi ni/N}) +$$
$$(z^-_{kL-i} e^{-j2\pi n(kL-i)/N} h^+_{tot}[i] e^{-j2\pi ni/N})$$

$$= \sum_{i=0}^{c} \sum_{k=0}^{N_1-1} (z^+_{kL-i} e^{-j2\pi n(kL-i)/N} h^-_{tot}[i] e^{-j2\pi ni/N}) +$$
$$(z^-_{kL-i} e^{-j2\pi n(kL-i)/N} h^+_{tot}[i] e^{-j2\pi ni/N})$$

$$= \sum_{i=0}^{c} \sum_{k=0}^{N_1-1} (y_{kL-i} e^{j(\omega T_c - 2\pi n/N)(kL-i)} h^-_{tot}[i] e^{-j2\pi ni/N}) +$$
$$(y_{kL-i} e^{-j(\omega T_c + 2\pi n/N)(kL-i)} h^+_{tot}[i] e^{-j2\pi ni/N})$$

where we assume $$h^{\pm}_{tot}[n]$$

is only nonzero for i=0,Λ, c.

For a given i, let us define $$l' = |i/L|$$

We can then define $$i' = l'L - i$$

where i'=0 . . . , L−1. Therefore, i=l'L−i'

From the above definitions, we have $$\sum_{k=0}^{N_1-1} y_{kL-i} e^{j(\omega T_c - 2\pi n/N)(kL-i)} = \sum_{k=0}^{l'-1} y_{kL-i} e^{j(\omega T_c - 2\pi n/N)(kL-i)} +$$
$$\sum_{k=l'}^{N_1-1} y_{kL-i} e^{j(\omega T_c - 2\pi n/N)(kL-i)}$$

$$= \sum_{k=0}^{l'-1} y_{(k-l')L+i'} e^{j(\omega T_c - 2\pi n/N)([k-l']L+i')} +$$
$$\sum_{k=l'}^{N_1-1} y_{(k-l')L+i'} e^{j(\omega T_c - 2\pi n/N)([k-l']L+i')}$$

$$= \sum_{k=0}^{l'-1} y_{(k-l'+N_1)L+i'} e^{j(\omega T_c - 2\pi n/N)([k-l'+N_1]L+i')} +$$
$$\sum_{k=0}^{N_1-1-l'} y_{kL+i'} e^{j(\omega T_c - 2\pi n/N)(kL+i')}$$

$$= \sum_{k=N_1-l'}^{N_1-1} y_{kL+i'} e^{j(\omega T_c - 2\pi n/N)(kL+i')} +$$
$$\sum_{k=0}^{N_1-1-l'} y_{kL+i'} e^{j(\omega T_c - 2\pi n/N)(kL+i')}$$

$$= \sum_{k=0}^{N_1-1} y_{kL+i'} e^{j(\omega T_c - 2\pi n/N)(kL+i')}$$

Similarly, $$\sum_{k=0}^{N_1-1} y_{kL-i} e^{-j(\omega T_c - 2\pi n/N)(kL-i)} = \sum_{k=0}^{N_1-1} y_{kL+i'} e^{-j(\omega T_c + 2\pi n/N)(kL+i')}$$

Therefore, $$q_n = \sum_{i=0}^{c} \sum_{k=0}^{N_1-1} y_{kL+i'} e^{j(\omega T_c - 2\pi n/N)(kL+i')} h^-_{tot}[i] e^{-j2\pi ni/N} +$$
$$y_{kL+i'} e^{-j(\omega T_c + 2\pi n/N)(kL+i')} h^+_{tot}[i] e^{-j2\pi ni/N}$$

$$= \sum_{i=0}^{c} \left[ \sum_{k=0}^{N_1-1} y_{kL+i'} e^{j(\omega T_c - 2\pi n/N)(kL+i')} \right] h^-_{tot}[i] e^{-j2\pi ni/N} +$$
$$\left[ \sum_{k=0}^{N_1-1} y_{kL+i'} e^{-j(\omega T_c + 2\pi n/N)(kL+i')} \right] h^+_{tot}[i] e^{-j2\pi ni/N}$$

$$= \sum_{i=0}^{c} \left[ \sum_{k=0}^{N_1-1} \left( \sum_{l=0}^{N-1} x_l e^{j2\pi(kL+i')l/N} \right) e^{j(\omega T_c - 2\pi n/N)(kL+i')} \right] h^-_{tot}[i] e^{-j2\pi ni/N} +$$
$$\sum_{i=0}^{c} \left[ \sum_{k=0}^{N_1-1} \left( \sum_{l=0}^{N-1} x_l e^{j2\pi(kL+i')l/N} \right) e^{-j(\omega T_c + 2\pi n/N)(kL+i')} \right] h^+_{tot}[i] e^{-j2\pi ni/N}$$

$$= \sum_{i=0}^{c} \left[ \sum_{k=0}^{N_1-1} \sum_{l=0}^{N-1} x_l e^{j[2\pi(l-n)/N + \omega T_c](kL+i')} \right] h^-_{tot}[i] e^{-j2\pi ni/N} +$$
$$\sum_{i=0}^{c} \left[ \sum_{k=0}^{N_1-1} \sum_{l=0}^{N-1} x_l e^{j[2\pi(l-n)/N - \omega T_c](kL+i')} \right] h^+_{tot}[i] e^{-j2\pi ni/N}$$

$$= \sum_{i=0}^{c} \left[ \sum_{l=0}^{N-1} x_l \sum_{k=0}^{N_1-1} e^{j[2\pi(l-n)/N + \omega T_c](kL+i')} \right] h^-_{tot}[i] e^{-j2\pi ni/N} +$$
$$\sum_{i=0}^{c} \left[ \sum_{l=0}^{N-1} x_l \sum_{k=0}^{N_1-1} e^{j[2\pi(l-n)/N - \omega T_c](kL+i')} \right] h^+_{tot}[i] e^{-j2\pi ni/N}$$

$$\omega = \frac{\pi}{T_c} \frac{b}{L}$$

where b=[Max, fill in . . . ] we have $2\pi(l-n)/N \pm \omega T_c = 2\pi [(l-n)/N \pm b/(2L)]$ Since $$\sum_{k=0}^{N_1-1} e^{j2\pi(kL+i')[(l-n)/N \pm b/(2L)]}$$

=0 when $(l-n)\pm(N/2L)b \neq mN_1$, we have $$q_n = N_1 \sum_{i=0}^{c}\left[\sum_{m=0}^{L-1} x_{mN_1+n-(N/2L)b}e^{j2\pi i'm/L}\right]h_{tot}^{-}[i]e^{-j2\pi ni/N_1} +$$

$$N_1 \sum_{i=0}^{c}\left[\sum_{m=0}^{L-1} x_{mN_1+n+(N/2L)b}e^{j2\pi i'm/L}\right]h_{tot}^{+}[i]e^{-j2\pi ni/N_1}$$

Knowing that $h_{tot}^{\pm}[i]$ is zero for $i<0$ and $i>c$, we have $$q_n = N_1 \sum_{i=0}^{c}\left[\sum_{m=0}^{L-1} x_{mN_1+n-(N/2L)b}e^{j2\pi i'm/L}\right]h_{tot}^{-}[i]e^{-j2\pi ni/N} +$$

$$N_1 \sum_{i=0}^{c}\left[\sum_{m=0}^{L-1} x_{mN_1+n+(N/2L)b}e^{j2\pi i'm/L}\right]h_{tot}^{+}[i]e^{-j2\pi ni/N}$$

$$= N_1 \sum_{i=0}^{\infty}\left[\sum_{m=0}^{L-1} x_{mN_1+n-(N/2L)b}e^{j2\pi i'm/L}\right]h_{tot}^{-}[i]e^{-j2\pi ni/N} +$$

$$N_1 \sum_{i=0}^{\infty}\left[\sum_{m=0}^{L-1} x_{mN_1+n+(N/2L)b}e^{j2\pi i'm/L}\right]h_{tot}^{+}[i]e^{-j2\pi ni/N}$$

$$= N_1 \sum_{l=-\infty}^{\infty}\sum_{i'=0}^{L-1}\left[\sum_{m=0}^{L-1} x_{mN_1+n-(N/2L)b}e^{j2\pi i'm/L}\right]h_{tot}^{-}[lL-i']e^{-j2\pi n(lL-i')/N} +$$

$$N_1 \sum_{l=-\infty}^{\infty}\sum_{i'=0}^{L-1}\left[\sum_{m=0}^{L-1} x_{mN_1+n+(N/2L)b}e^{j2\pi i'm/L}\right]h_{tot}^{+}[lL-i']e^{-j2\pi n(lL-i')/N}$$

$$= N_1 \sum_{m=0}^{L-1} x_{mN_1+n-(N/2L)b}\sum_{i'=0}^{L-1}e^{j2\pi i'm/L}\sum_{l=-\infty}^{\infty}h_{tot}^{-}[lL-i']e^{-j2\pi n(lL-i')/N} +$$

$$N_1 \sum_{m=0}^{L-1} x_{mN_1+n+(N/2L)b}\sum_{i'=0}^{L-1}e^{j2\pi i'm/L}\sum_{l=-\infty}^{\infty}h_{tot}^{+}[lL-i']e^{-j2\pi n(lL-i')/N}$$

Since $$\sum_{l=-\infty}^{\infty}h_{tot}^{\pm}[lL-i']e^{-j2\pi n(lL-i')/N} = \sum_{l=-\infty}^{\infty}h_{tot}^{\pm}[lL-i']e^{-j\omega(lL-i')T_c}\bigg|_{\omega=2\pi n/NT_c}$$

$$= F\left\{h_{tot}^{\pm}(t)\sum_{t}\delta(t-[lL-i']T_c)\right\}\bigg|_{\omega=2\pi n/NT_c}$$

$$= \frac{1}{2\pi}C_{tot}^{\pm}(\omega) \otimes$$

$$\left[\frac{2\pi}{LT_c}\sum_{l}\delta\left(\omega - \frac{2\pi l}{LT_c}\right)e^{j2\pi li'/L}\right]\bigg|_{\omega=2\pi n/NT_c}$$

$$= \frac{1}{LT_c}\sum_{l}C_{tot}^{\pm}\left(\frac{2\pi n}{NT_c} - \frac{2\pi l}{LT_c}\right)e^{j2\pi li'/L}$$

we have $$q_n = N_1 \sum_{m=0}^{L-1} x_{mN_1+n-(N/2L)b}\sum_{i'=0}^{L-1}e^{j2\pi i'm/L}\sum_{l=-\infty}^{\infty}h_{tot}^{-}[lL-i']e^{-j2\pi n(lL-i')/N} +$$

$$N_1 \sum_{m=0}^{L-1} x_{mN_1+n+(N/2L)b}\sum_{i'=0}^{L-1}e^{j2\pi i'm/L}\sum_{l=-\infty}^{\infty}h_{tot}^{+}[lL-i']e^{-j2\pi n(lL-i')/N}$$

$$= N_1 \sum_{m=0}^{L-1} x_{mN_1+n+(N/2L)b}\sum_{i'=0}^{L-1}e^{j2\pi i'm/L}\frac{1}{LT_c}\sum_{l}H_{tot}^{-}\left(\frac{2\pi n}{NT_c} - \frac{2\pi l}{LT_c}\right)e^{j2\pi li'/L} +$$

$$N_1 \sum_{m=0}^{L-1} x_{mN_1+n-(N/2L)b}\sum_{i'=0}^{L-1}e^{j2\pi i'm/L}\frac{1}{LT_c}\sum_{l}H_{tot}^{+}\left(\frac{2\pi n}{NT_c} - \frac{2\pi l}{LT_c}\right)e^{j2\pi li'/L}$$

$$= \frac{N_1}{LT_c}\sum_{m=0}^{L-1} x_{mN_1+n-(N/2L)b}\sum_{l}H_{tot}^{-}\left(\frac{2\pi n}{NT_c} - \frac{2\pi l}{LT_c}\right)\sum_{i'=0}^{L-1}e^{j2\pi(l+m)i'/L} +$$

$$\frac{N_1}{LT_c}\sum_{m=0}^{L-1} x_{mN_1+n+(N/2L)b}\sum_{l}H_{tot}^{+}\left(\frac{2\pi n}{NT_c} - \frac{2\pi l}{LT_c}\right)\sum_{i'=0}^{L-1}e^{j2\pi(l+m)i'/L}$$

$$= \frac{N_1}{T_c}\sum_{m=0}^{L-1} x_{mN_1+n-(N/2L)b}H_{tot}^{-}\left(\frac{2\pi n}{NT_c} + \frac{2\pi m}{LT_c}\right) +$$

$$\frac{N_1}{T_c}\sum_{m=0}^{L-1} x_{mN_1+n+(N/2L)b}H_{tot}^{+}\left(\frac{2\pi n}{NT_c} + \frac{2\pi m}{LT_c}\right)$$

$$= \frac{N_1}{T_c}\sum_{m=0}^{L-1} x_{mN_1+n-(N/2L)b}H_{tot}^{-}\left(\frac{2\pi}{NT_c}[mN_1+n]\right) +$$

$$\sum_{m=0}^{L-1} x_{mN_1+n+(N/2L)b}H_{tot}^{+}\left(\frac{2\pi}{NT_c}[mN_1+n]\right), n=0,\ldots,N_1-1$$

$$= N_1 \sum_{m=0}^{L-1} x_{mN_1+n-(N/2L)b}H_{tot}^{-}[mN_1+n] +$$

$$N_1 \sum_{m=0}^{L-1} x_{mN_1+n+(N/2L)b}H_{tot}^{+}[mN_1+n]$$

where $$H_{tot}^{\pm}[n] = \frac{1}{T_c}H_{tot}^{\pm}\left(\frac{2\pi}{NT_c}n\right), \text{ for } 0 \leq n < N$$

Since $H_{tot}^{30}[n]$ is low pass (i.e. nonzero only when $0 \leq n < N_1/2$), the second term above is nonzero only when $m=0$. Similarly, since $H_{tot}^{-}[n]$ is nonzero only when $N-(N/2L) \leq n < N$, the first term above is nonzero only when $m=L-1$.

Relationship between $q_n$ and $x_n$

Figure 1G:
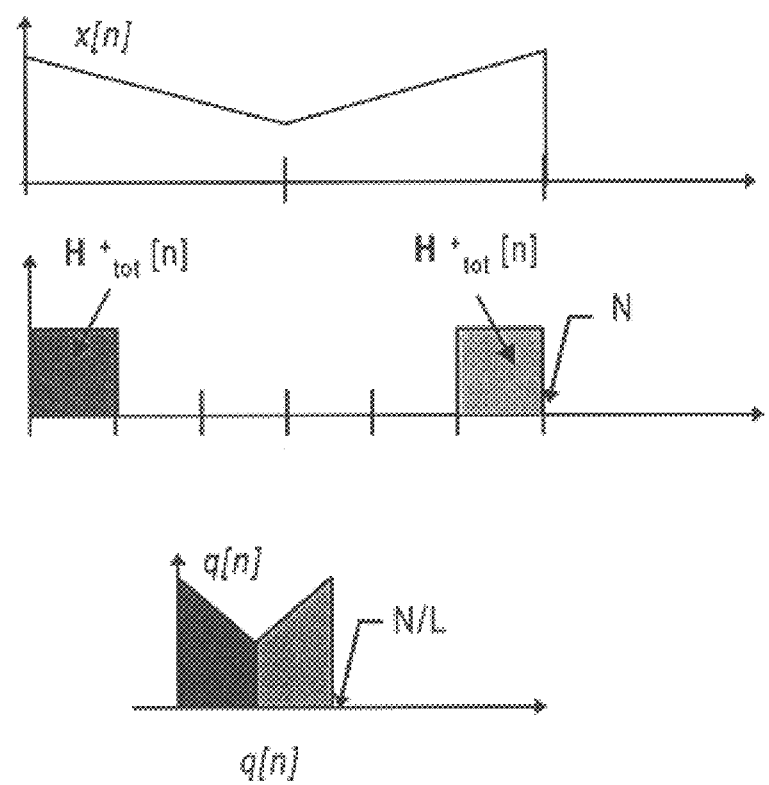
Figure 1H:
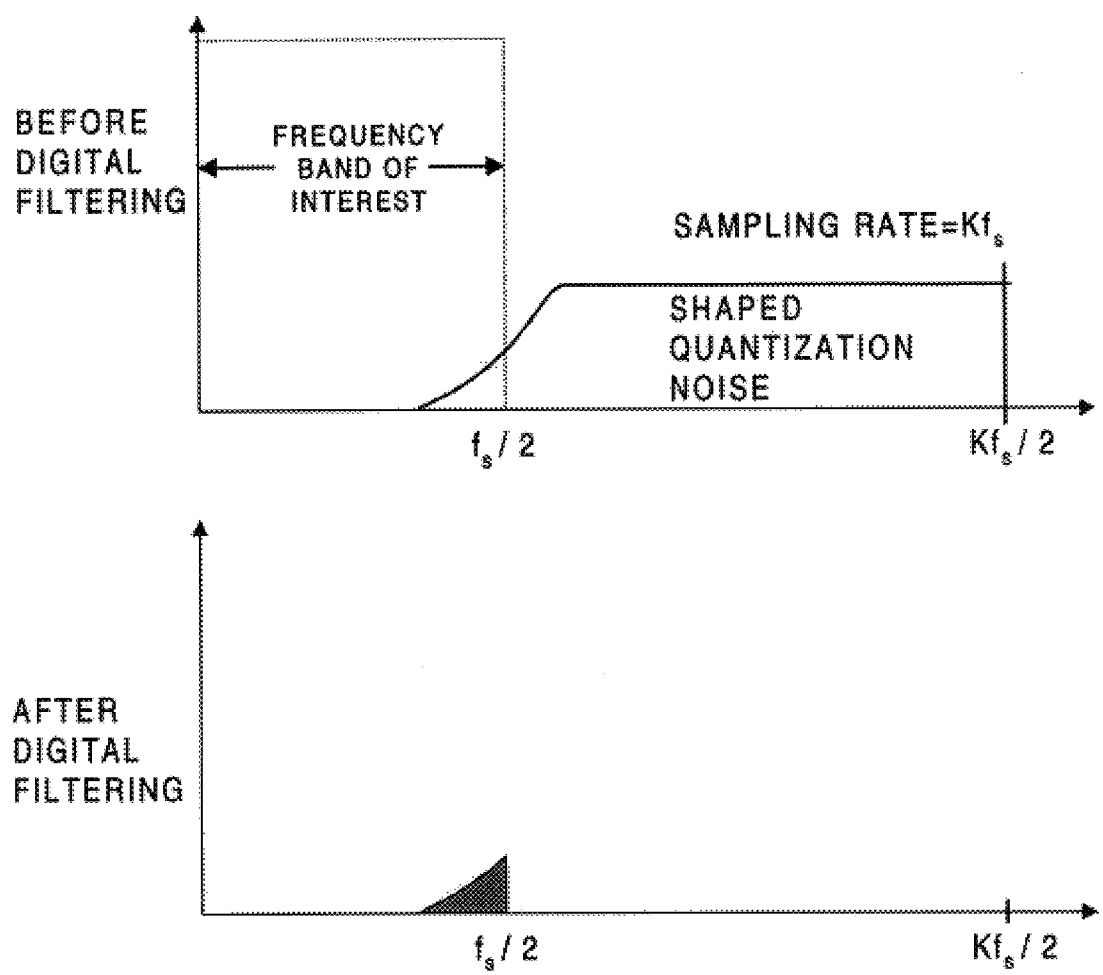
FIG. 1H illustrates the reduction in quantization noise achieved by a sigma delta modulator and low pass filter operating on an input analog signal.

From the above observation, we have $q_n = x_{n+(N/2L)b}H_{tot}^{+}[n]$, when $0 \leq n < (N/2L) = x_{n+N-(N/2L)b}H_{tot}^{-}[n]$, when $(N/2L) \leq n < (N/L) = N_1$ Above discussion is illustrated in FIG. 1G for L=3.

Although the present invention has been described in terms of a preferred ADSL embodiment, it will be apparent to those skilled in the art that many alterations and modifications may be made to such embodiments without departing from the teachings of the present invention. For example, it is apparent that the present invention would be beneficial used in any xDSL or high-speed multi-carrier application environment. Other types of VLSI and ULSI components beyond those illustrated in the foregoing detailed description can be used suitably with the present invention. Accordingly, it is intended that the all such alterations and modifications be included within the scope and spirit of the invention as defined by the following claims.

What is claimed is:

1. A high speed communications transceiver for communicating through a channel with an upstream transceiver transmitting an analog data signal using M data carrying signals within a bandwidth F to the transceiver, said transceiver comprising:

a channel interface circuit for coupling to and receiving said analog data signal from the channel; and a front end receiving circuit for performing filtering and analog to digital conversion on the entire analog data signal by: (i) dividing such signal into a plurality of sub-bands, each sub-band including data from a frequency band which is a fractional portion of said bandwidth F and which contains a number of data carrying signals B, where B>1; and (ii) by sampling the sub-bands and generating a plurality of digital signals corresponding to data carrying signals within such sub-band; and a signal processing circuit for extracting data from the plurality of digital signals within the plurality of sub-bands.

2. The transceiver of claim 1, wherein the front end receiving circuit includes N sub-band filters for dividing the analog data signal into N filtered analog data signals occupying N different frequency bands.

3. The transceiver of claim 2, wherein the N frequency bands are all approximately equal to a frequency bandwidth size f, where f<F.

4. The transceiver of claim 3, where a number of sub-band filters N is selected so that F=N*f.

5. The transceiver of claim 4, wherein the N sub-band filters are arranged in parallel and each operates simultaneously on different frequency portion k*f of said analog signal, where k={1, 2, 3, . . . N−1}.

6. The transceiver of claim 2, wherein the front end receiving circuit shifts the N filtered analog data signals to generate N baseband analog data signals.

7. The transceiver of claim 6, wherein the front end receiving circuit includes N analog to digital converters for sampling and converting the N baseband analog data signals to generate N digital signals.

8. The transceiver of claim 7, wherein the N analog to digital converters are comprised of N substantially identical Sigma Delta modulators and N filters associated with such Sigma Delta modulators.

9. The transceiver of claim 8, wherein N=2, 4 or 8.

10. The transceiver of claim 9, wherein quantization noise in the N digital signals is less than that in the N filtered analog data signals.

11. The transceiver of claim 1, wherein the front end receiving circuit is implemented in a number of modular analog front end stages for performing the filtering and analog to digital conversion, such that any one or all of such stages can be easily replaced.

12. The transceiver of claim 1, wherein data sampling requirements of the front end are reduced because data sampling is only performed on fractional portions of analog data signal.

13. The transceiver of claim 1, wherein dividing the analog data signal results in reduced clipping noise.

14. The transceiver of claim 2, wherein the front end receiving circuit is programmable, such that such front end receiving circuit can be programmed to perform filtering and analog to digital conversion on a second analog data signal having a frequency greater than said analog data signal.

15. The transceiver of claim 1, wherein the signal processing circuit includes a host processor circuit in a host processing device for extracting the data from the data carrying signals.

16. The transceiver of claim 1, wherein the signal processing circuit includes a digital signal processor for extracting the data from the data carrying signals.

17. The transceiver of claim 16 further including a control circuit coupled to the signal processing circuit for distributing the extracted data to one or more host processing systems.

18. The transceiver of claim 1, wherein the upstream transceiver uses discrete multi-tone (DMT) modulation for generating the analog data signal and the channel supports asymmetric digital subscriber loop (ADSL) transmission standards.

19. A high speed communications system for receiving an analog data signal through a channel, said analog data signal containing data signals in L modulated sub-channels from an upstream transceiver, said system comprising:

a channel interface circuit for coupling to and receiving said analog data signal from the channel; and a frontend receiving circuit for performing filtering and analog to digital conversion on the entire analog data signal by: (i) grouping such signal into a plurality of subchannel sets, each set including data from a number of subchannels; and (ii) by sampling each of the sets and generating a plurality of digital signals corresponding to data signals within such subchannel set; and a signal processing circuit for extracting data from the plurality of digital signals within the plural of subchannel sets.

20. The system of claim 19, wherein the front end receiving circuit includes N subchannel filters for dividing the analog data signal into N filtered analog data signals corresponding to N different subchannel sets.

21. The system of claim 20, wherein the N subchannel sets all include an approximately equal number of subchannels B, where B<L.

22. The system of claim 21, where a number of subchannel filters N is selected so that L=B*N.

23. The system of claim 22, wherein the N subchannel filters are arranged in parallel and each operates simultaneously on different subchannel set k of said analog signal, where k={0, 1, 2, 3, . . . N−1}.

24. The system of claim 20, wherein the front end receiving circuit modulates the N filtered analog data signals to generate N frequency shifted analog data signals.

25. The system of claim 24, wherein the front end receiving circuit includes N analog to digital converters for sampling and converting the N frequency shifted analog data signals to generate N digital signals.

26. The system of claim 25, wherein the N analog to digital converters are comprised of N substantially identical Sigma Delta modulators and N filters associated with such Sigma Delta modulators.

27. The system of claim 26, wherein N=2, 4 or 8.

28. The system of claim 27, wherein the quantization noise in the N digital signals is less than that in the N filtered analog data signals.

29. The system of claim 19, wherein data sampling requirements of the front end receiving circuit are reduced because data sampling is only performed on smaller subsets of the L modulated subchannels.

30. The system of claim 19, wherein dividing the analog data signal into subchannel sets results in reduced clipping noise.

31. The system of claim 19, wherein the front end receiving circuit is implemented in a number of modular analog front end stages for performing the filtering and analog to digital conversion, such that any one or all of such stages can be easily replaced in said system.

32. The system of claim 20, wherein the front end receiving circuit is programmable, such that such receiving circuit can be programmed to perform filtering and analog to digital conversion on a second analog data signal having a frequency greater than said analog data signal.

33. The system of claim 19, wherein the signal processing circuit includes a host processor circuit in a host processing device for extracting the data from the data carrying signals.

34. The system of claim 19 wherein the signal processing circuit includes a digital signal processor for extracting the data from the data carrying signals.

35. The system of claim 34, further including a control circuit coupled to the signal processing circuit for distributing the extracted data to one or more host processing systems.

36. The system of claim 35, wherein the upstream transceiver uses discrete multi-tone (DMT) modulation for generating the M modulated sub-channels, and the channel supports asymmetric digital subscriber loop (ADSL) transmission standards.

37. A data distribution circuit for controlling a high speed transceiver, said transceiver including M data ports (M>=2), and each of said data ports includes an analog front end circuit for filtering and sampling a separate portion of an analog signal having a frequency bandwidth F received by said transceiver through a channel, said data distribution circuit comprising:
   a transceiver interface coupled to said transceiver, and
   a bus interface coupled to a plurality of processing devices; and
   a control circuit for configuring said M data ports based on configuration information received from the processing devices;
   wherein received data in said analog signal can be allocated and shared between such processing devices; and
   further wherein sampling rate requirements associated with handling the analog signal are reduced by dividing such analog signal into M separate portions that are operated on independently by the M data ports.

38. The circuit of claim 37 wherein said control circuit generates control signals:
   (i) for controlling the filtering performed by said M data ports, such that M filtered analog signals can be generated by dividing the frequency bandwidth of said analog signal into M sub-bands; and
   (ii) for controlling the sampling performed by said M data ports on the M filtered analog signals, such that digital signals corresponding to data signals within each of the M filtered analog signals are generated by said front end circuits.

39. The circuit of claim 38, wherein the M sub-bands are all approximately equal to a frequency bandwidth size f, and where F=M*f.

40. The circuit of claim 39, wherein the control circuit configures the M data ports such that sampling is performed on M frequency shifted analog data signals that are generated by modulating the M filtered analog data signals.

41. The circuit of claim 38, wherein the control circuit generates control signals transmitted through the transceiver interface for controlling a signal processing circuit which extracts the received data from said analog signal.

42. The circuit of claim 38, wherein the analog signal includes data from a set of N modulated subchannels and the processing devices each receive data from a different subset of the N sub-channels.

43. The circuit of claim 38 wherein said control circuit can configure said transceiver such that any one of said processing devices can utilize all of said data ports at the same time.

44. A method of operating a high speed communications system that is coupled to an upstream transceiver through a channel capable of supporting an analog signal including M modulated sub-channels, said method comprising the steps of:
   (a) receiving said analog signal from the upstream transceiver through the channel;
   (b) dividing such signal into a plurality of sub-bands, each sub-band including data from a number (B) of sub-channels from the M sub-channels, where B>1; and
   (c) sampling the sub-bands and generating a plurality of digital signals corresponding to data signals within such sub-band; and
   (d) extracting data from the plurality of digital signals within the plurality of sub-bands.

45. The method of claim 44 wherein during step (b) N sub-band filters are used for dividing the analog data signal into N filtered analog data signals occupying N different frequency bands.

46. The method of claim 45, wherein the N frequency bands are all approximately equal to a frequency bandwidth size f, where f<F, and each frequency band contains approximately the same number of sub-channels, p, where p<M.

47. The method of claim 46, where a number of sub-band filters N is selected so that F=N*f, and M=N*p.

48. The method of claim 47, wherein the N sub-band filters are arranged in parallel and each operates simultaneously on different frequency portion k*f of said analog signal, where k={0, 1, 2, 3, . . . N−1}.

49. The method of claim 45, further including a step (b)(2) after step (b): modulating the N filtered analog data signals to generate N frequency shifted analog data signals.

50. The method of claim 44, wherein during step (c) N analog to digital converters sample and convert the N frequency shifted analog data signals to generate N digital signals.

51. The method of claim 50, wherein the N analog to digital converters are comprised of N substantially identical Sigma Delta modulators and N filters associated with such Sigma Delta modulators.

52. The method of claim 50, wherein N=2, 4 or 8.

53. The method of claim 52, wherein the quantization noise in the N digital signals is less than that in the N filtered analog data signals.

54. The method of claim 44, wherein a first modular front end circuit is used for performing steps (b) and (c), and further including a step (e): substituting a second front end circuit for the first front end circuit, the second front end circuit being capable of performing filtering and analog to digital conversion on a second analog data signal having a frequency greater than said analog data signal.

55. The method of claim 44, wherein sampling requirements are reduced because data sampling is only performed on fractional portions of said analog data signal.

56. The method of claim 44, wherein dividing said analog data signal results in reduced clipping noise.

57. The method of claim 54, wherein the front end receiving circuit is programmable, and further including a step (f): programming the front end receiving circuit to perform filtering and analog to digital conversion on a second analog data signal having a frequency greater than said analog data signal.

58. The method of claim 44, wherein the signal processing circuit includes a host processor circuit in a host processing device for extracting the data from the data carrying signals.

59. The method of claim 44 wherein the signal processing circuit includes a digital signal processor for extracting the data from the data carrying signals.

60. The method of claim 59, further including a control circuit coupled to the signal processing circuit for distributing the extracted data to one or more host processing systems.

61. The method of claim 44, wherein the upstream transceiver uses discrete multi-tone (DMT) modulation for generating the M modulated sub-channels, and the channel supports asymmetric digital subscriber loop (ADSL) transmission standards.

62. An analog front end (AFE) circuit used in a data communications system that uses an xDSL-based analog signal including M discrete multitone (DMT) modulated sub-channels for: carrying a data transmission, the AFE circuit including:

a channel interface circuit for receiving the xDSL based analog signal from a remote transceiver through a digital subscriber loop (DSL); and a set of N sub-band filters for dividing and filtering the xDSL based analog signal to generate a set of N separate sub-band analog signals, such that each of said N separate sub-band signals includes a bandwidth sufficient to carry at least B DMT sub-channels, where B>1, and such set of N sub-band filters being configured so that all of the M DMT sub-channels can be included within said N separate sub-band signals; and a set of N analog to digital converters for converting said N separate sub-band analog signals into N separate sub-band digital signals, each of said N analog to digital converters receiving a corresponding one of said N separate sub-band analog signals; and wherein analog to digital data sampling requirements are reduced for handling the data transmission carried by the M DMT sub-channels as a result of the xDSL based analog signal being divided into at least N separate portions before being processed by said set of N analog to digital converters.

63. The AFE circuit of claim 62, wherein said set of N analog to digital converters are implemented as N substantially identical and separate sigma delta modulators that produce less noise output handling said N separate filtered analog signals than would a single Nyquist based analog to digital converter handling all of the xDSL based analog signal.

64. The AFE circuit of claim 62, wherein during a first time period, the xDSL based analog signal is divided so that a first number of the M sub-channels are processed, and during a second time period, the xDSL based analog signal is divided so that a remaining number of the M sub-channels are processed.

65. The method of claim 62 wherein the data transmission is performed in accordance with T1.413 based protocols.

66. A method of operating an analog front end circuit used in a data communications system that uses an xDSL-based analog signal including M discrete multitone (DNM modulated sub-channels for carrying a data transmission, said method comprising the steps of:

(a) receiving the xDSL based analog signal from a remote transceiver through a digital subscriber loop PSL); and (b) filtering the xDSL based analog signal such that a selectable number of the M sub-channels can be used for the data transmission; and (c) dividing the xDSL based analog signal into N sub-band signals, each of said N sub-band signals occupying a frequency bandwidth corresponding in size to include at least a set of sub-channels B, where B>1, and such that N resulting separate sets of B or more sub-channels are used to constitute said selectable number of the M sub-channels; and (d) separately sampling the N sub-band signals and generating a set of N separate digital signals that correspond to data signals embodied in each of said N separate sets of B or more sub-channels; and wherein analog to digital data sampling requirements are reduced for handling the data transmission received as data signals carried by the selectable number of the M sub-channels as a result of the xDSL based analog signal being initially divided into at least N separate portions, and where said N separate portions are processed separately.

67. The method of claim 66 wherein step (d) is performed by N substantially identical and separate sigma delta modulators that produce less noise output than would a Nyquist based analog to digital converter processing all of the xDSL based analog signal.

68. The method of claim 66 wherein during a first time period, said xDSL based analog signal is divided so that a first portion of said M sub-channels are processed, and during a second time period, said xDSL based analog signal is divided so that a remaining portion of said M sub-channels are processed.

69. The method of claim 66 wherein said data transmission is performed in accordance with T1.413 based protocols.

70. A shared xDSL compatible data communications system comprising:

a channel interface circuit adapted for receiving an xDSL based analog signal from a remote transceiver through a digital subscriber loop (DSL), said xDSL based analog signal being used to carry up to M discrete multi-tone (DMT) modulated sub-channels; and a plurality of front end filters (N) for determining a bandwidth of said xDSL based analog signal, and for dividing said xDSL based analog signal into N separate filtered analog signals based on total available bandwidth in said DSL as well as requirements of one or more users of the xDSL compatible data communications system, said N separate filtered analog signals having a bandwidth corresponding to at least B DMT sub-channels, where B>1; and a plurality of analog to digital converters (N) each coupled to a separate one of said plurality of front end filters and generating a digital output signal based on one of said N separate filtered analog signals, such that N separate digital output signals are generated; and a control circuit for distributing said N separate digital output signals to one or more signal processing circuits associated with said one or more users for demodulation of said B DMT sub-channels;

wherein said DSL can be shared by said one or more users during said data transmission.

71. The system of claim 70, wherein said plurality of analog to digital converters are implemented as N substantially identical and separate sigma delta modulators that produce less noise output handling said N separate filtered analog signals than would a single Nyquist based analog to digital converter handling all of said xDSL based analog signal.

72. The system of claim 70, wherein during a first time period, said xDSL based analog signal is divided so that a first portion of said M sub-channels are processed, and during a second time period, said xDSL based analog signal is divided so that a remaining portion of said M sub-channels are processed.

73. The system of claim 70 wherein said data transmission is performed in accordance with T1.413 based protocols.

74. A method of operating a shared xDSL compatible data communications system comprising the steps of:

(a) receiving an xDSL based analog signal from a remote transceiver through a digital subscriber loop (DSL);

(b) selecting, a number (M) of discrete multi-tone (DMT) sub-channels to be included in the xDSL based analog signal for a data transmission, where M is based on total available bandwidth in said DSL as well as requirements of one or more users of the xDSL compatible data communications system;

(c) sharing said M DMT subchannels for data transmission between said one or more users by dividing said M DMT sub-channels into N separate data sub-bands having B or more sub-channels, where B>1, said N separate data sub-bands being configured in number and size in accordance with transmission requirements of said one or more users;

(d) separately performing A/D operations on N separate sub-band signals associated with said N separate data sub-bands to extract N separate digital signals;

(e) demodulating said N separate digital signals to extract data for said one or more users;

wherein said DSL can be shared by said one or more users during said data transmission.

75. A method of operating a shared xDSL compatible data communications system comprising the steps of:

(a) receiving an xDSL based analog signal from a remote transceiver through a digital subscriber loop (DSL);

(b) selecting a frequency bandwidth F for said xDSL based analog signal to be used for the data transmission, where F is based on total available bandwidth in said DSL as well as requirements of one or more users of the xDSL compatible data communications system;

(c) sharing said frequency bandwidth F for data transmission between said one or more users by dividing said frequency bandwidth F into N separate data sub-bands, said N separate data sub-bands being configured in number and size in accordance with transmission requirements of said one or more users;

(d) performing separate A/D operations on N separate sub-band signals associated with said N separate data sub-bands to extract N separate digital signals;

(e) demodulating said N separate digital signals to extract data for said one or more users;

wherein said frequency bandwidth F bandwidth of said DSL can be shared by said one or more users.

* * * * *